Sept. 14, 1965   C. A. RICARD ETAL   3,206,063
ARTICLE ORIENTING AND FEEDING APPARATUS
Filed Sept. 10, 1962   3 Sheets-Sheet 1
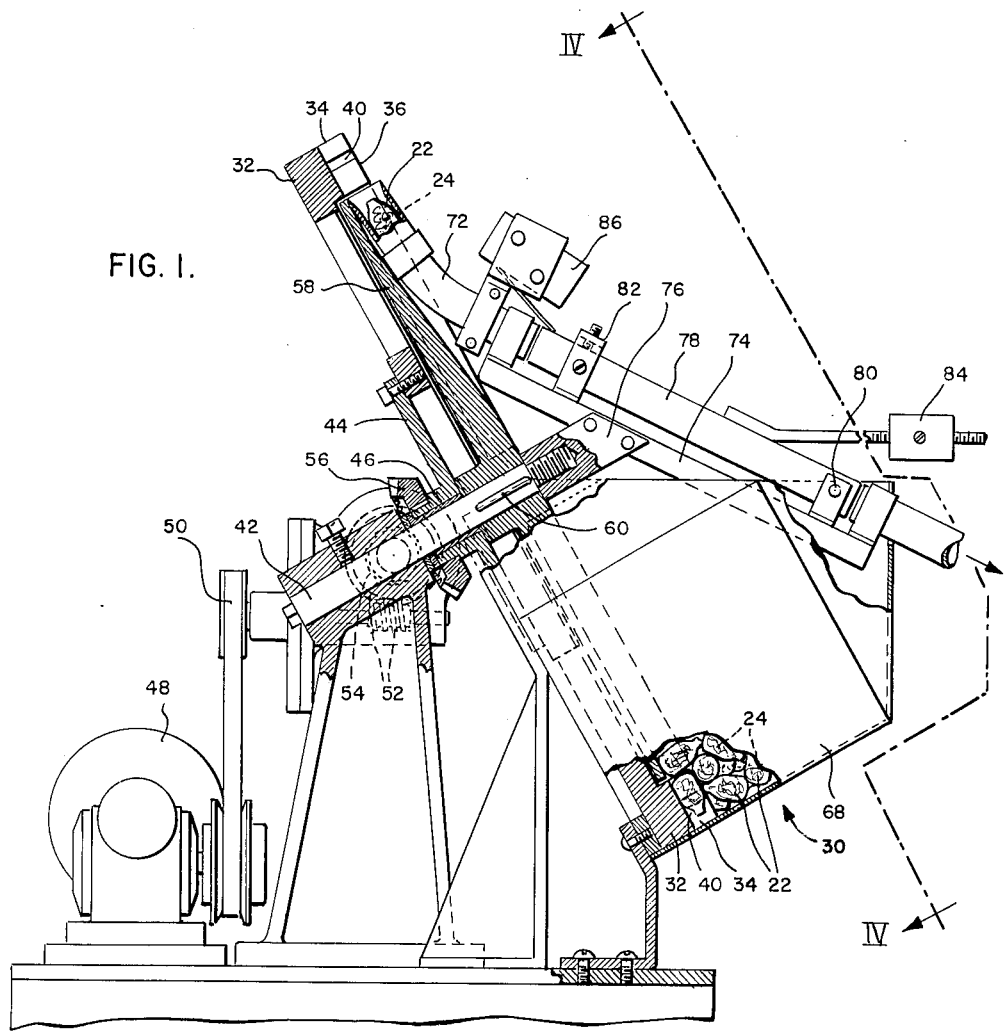
FIG. 1.
FIG. 2.
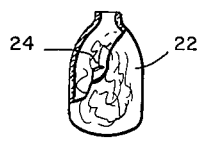
FIG. 3.
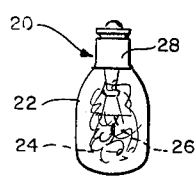
INVENTORS.
CARL A. RICARD and
HENRY P. HASELL.
BY
W. D. Palmer
ATTORNEY.

Sept. 14, 1965 C. A. RICARD ETAL 3,206,063
ARTICLE ORIENTING AND FEEDING APPARATUS
Filed Sept. 10, 1962 3 Sheets-Sheet 2

INVENTORS
CARL A. RICARD and
HENRY P. HASELL.
BY
W. D. Palmer
ATTORNEY

United States Patent Office 3,206,063
Patented Sept. 14, 1965

3,206,063
ARTICLE ORIENTING AND FEEDING
APPARATUS
Carl A. Ricard, Fair Lawn, and Henry P. Hasell, Bloomfield, N.J., assignors to Westinghouse Electric Corporation, Pittsburgh, Pa., a corporation of Pennsylvania
Filed Sept. 10, 1962, Ser. No. 222,561
4 Claims. (Cl. 221—10)

This invention relates to article orienting and feeding apparatus, and, more particularly, to an apparatus for first orienting randomly disposed articles into a predetermined position and thereafter feeding such positioned articles.

In the manufacture of a photoflash lamp, the open-necked bulb is first filled with combustible foil. Thereafter, the bulb is filled with a combustion-supporting atmosphere and the mount, which includes the firing filament, is sealed to the neck of the bulb. The base is then affixed to the mount and the lamp lacquer coated.

After the bulbs have been filled with the combustible foil, problems have been encountered in feeding the foil-filled bulbs to the gas-filling and mounting machine.

It is the general object of the present invention to avoid and overcome the foregoing and other difficulties of the practices of the prior art by providing an apparatus for properly orienting and feeding bulb-shaped articles, which bulb-shaped articles are generally symmetrical about a longitudinal axis and have neck portions which are generally constricted with respect to the body portions thereof.

It is another object to provide an apparatus for turning a portion of the articles retained in a moving article receiving member so that all of the articles are oriented in the same direction.

It is a further object to provide apparatus details for an article orienting and feeding apparatus.

The aforesaid objects of the invention, and other objects which will become apparent as the description proceeds, are achieved by providing an article receiving member which is rotatable about an inclined axis. A hopper which receives the randomly disposed articles is positioned about the lower peripheral portion of the receiving member. The receiving member contains a plurality of article receiving pockets which each receive an article from the hopper so that the axial portion of received articles is generally radial of the axis of the receiving member, but with some of the neck portions of the received articles facing toward the axis of the receiving member and some of the article neck portions facing away from the axis of the receiving member. An elongated cam is fixed proximate to the path of rotation of the receiving member. The cam acts to successively contact any articles having neck portions which face the axis of the receiving member, and to invert such articles in the receiving pockets so that the neck portions of all articles are oriented in the same direction. A chute is provided on a path of rotation of the receiving member immediately after the cam, and the properly oriented articles drop into the chute for feeding to the next lamp fabricating operation.

For a better understanding of the invention, reference should be had to the accompanying drawings wherein:

FIGURE 1 is an elevational view, partly in section, illustrating the article orienting and feeding apparatus of the present invention;

FIG. 2 is an elevational view, partly in section, showing a foil-filled photoflash bulb which is adapted to be oriented and fed by the apparatus of the present invention;

FIG. 3 illustrates in an elevational view a finished photoflash lamp;

Figure 4:
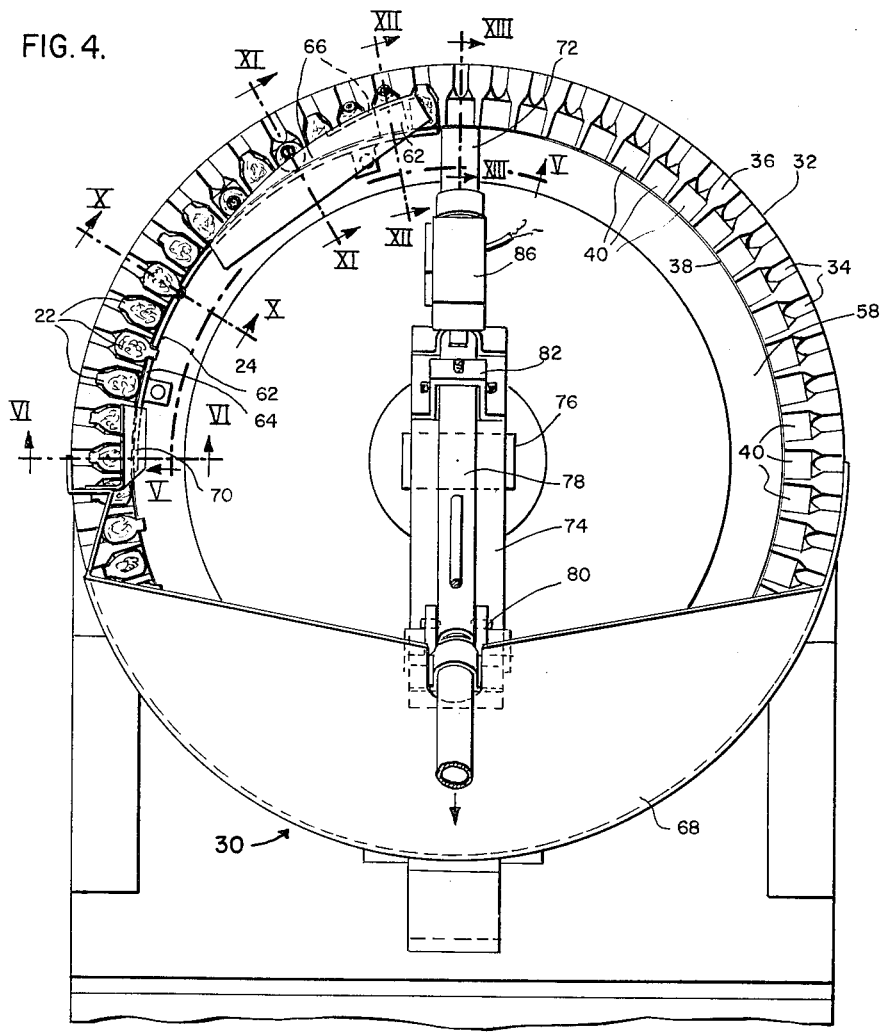
FIG. 4 is a side view taken on the line IV—IV in FIG. 1, in the direction of the arrows, illustrating the apparatus of the present invention.
Figure 13:
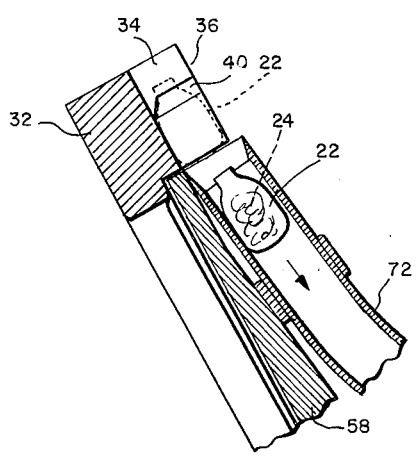
Figure 12:
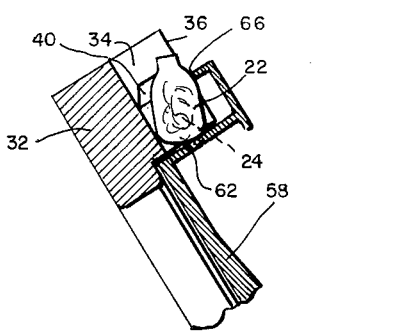

FIG. 12 is a fragmentary sectional view taken on the line XII—XII in FIG. 4, in the direction of the arrows, showing the bulb when it has been substantially reversed to have the desired positioning in a pocket of the receiving member; and, FIG. 13 is a fragmentary sectional view taken on the line XIII—XIII in FIG. 4, in the direction of the arrows, showing a properly oriented bulb being fed down the receiving chute.

While the present apparatus has utility with respect to orienting and feeding any bulb-shaped article having a constricted neck portion, the apparatus is particularly adapted to orient and feed foil-filled photoflash bulbs, and hence it has been so illustrated and will be so described.

With specific reference to the form of the invention illustrated in the drawings, the finished photoflash bulb 20, as shown in FIG. 3, is of conventional design and comprises an envelope 22 which contains a filling of foil 24 and a combustion supporting atmosphere such as oxygen. The foil 24 is adapted to be ignited by a firing filament 26 which is electrically connected to a standard base 28. The foil-filled bulb 22 is shown in FIG. 2 and foil filling machines used to load the foil 24 into the bulb 22 are well known in the art.

Referring to FIGS. 1 and 4, the apparatus 30 of the present invention comprises disc 32 which is generally circular in configuration and is adapted to be rotated about its axis which is inclined a predetermined amount with respect to the horizontal. A generally circular article receiving member 34 laterally projects from the upward-facing peripheral portion of the disc 32. The article receiving member 34 is conformed to present a surface 36 which generally parallels the disc 32 and an inner surface 38 which generally faces the axis of the disc 32. As a specific example, the axis of the disc 32 is inclined at an angle of 30° from the horizontal.

Provided in the article receiving member 34 are a plurality of article receiving pockets 40 which are generally parallel with the disc 32 and which open into the surfaces 36 and 38 of the receiving member 34. In the specific apparatus described, there are sixty pockets in the receiving member 34. The pockets 40 each have a predetermined configuration and are adapted to receive and retain the bulbs 22 so that the axial portions thereof generally parallel the disc 32.

The disc 32 rotates on a fixed shaft 42 and is attached to a circular flange 44 which has affixed thereto a sleeve bearing 46 riding on the shaft 42. A reduction motor 48 drives the disc 32 at a constant rate of speed through a belt drive 50 affixed to a worm and worm wheel 52, a gear 54 and a bevel gear 56 attached to the flange 44.

Figure 5:
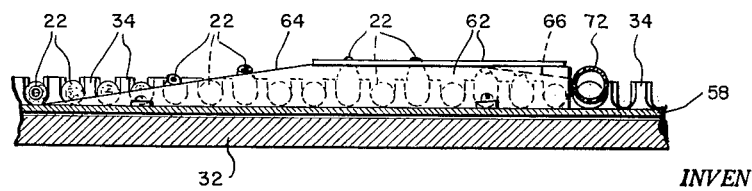
FIG. 5 is a fragmentary cross-sectional view taken on the line V—V in FIG. 4, in the direction of the arrows, showing the fixed cam which is used to invert the incorrectly disposed bulbs.

A generally circular flange 58 is affixed to the shaft 42 by means of a key 60, and the peripheral portion of the flange 58 has attached thereto a fixed bulb inverting cam 62. The fixed cam 62 is elongated, as shown in FIGS. 4 and 5, and is positioned proximate to the path of rotation of the bulb receiving member 34. The first portion of the cam 62 has a gradually rising surface 64, and the latter portion of the cam (see FIGS. 11 and 12) has a surface 66 which projects away from the axis of the disc 32 and thereafter turns inwardly toward the surface of the disc 32 to cause inverted bulbs to seat in their pockets. The action of the cam 62 in inverting any improperly oriented bulbs within their respective pockets will be described in detail hereinafter.

A fixed hopper 68 is positioned about the lower portion of the periphery of the inclined disc 32 and is adapted to receive the randomly disposed foil-filled bulbs 22 which are to be oriented and fed. When the disc 32 is rotated, each of the pockets 40, on passing through the bulb-filled hopper 68, will receive and retain one of the bulbs 22, with the axial portion of such received bulbs generally paralleling the disc 32 and generally radial of the axis of the disc 32. The hopper 68 is preferably of such dimensions that the article receiving pockets 40 are within the hopper for almost half the period of rotation of the disc 32, to assure that a bulb 22 is placed in every pocket 40. In addition, the disc 32 is designed to be rotated with a relatively slow and constant speed so that the foil in the bulbs will not be disturbed. As a specific example, the disc rotates with a speed of 54 revolutions per hour and has a diameter of twenty-four inches.

Figure 6:
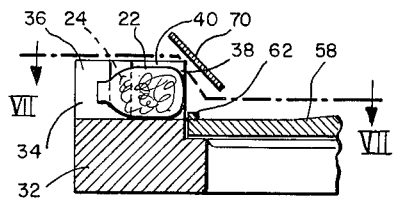
FIG. 6 is a fragmentary cross-sectional view taken on the line VI—VI in FIG. 4, in the direction of the arrows, showing the fixed member which is used to insure that excess bulbs are not carried with the rotating bulb-receiving member, and also showing a bulb oriented in the desired position in a pocket of the receiving member.
Figure 8:
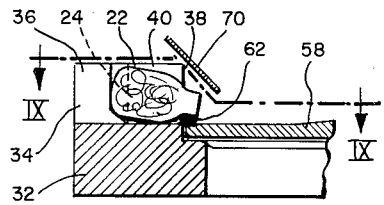
FIG. 8 is a view similar to FIG. 6, but showing an improperly oriented bulb as retained in a pocket of the article receiving member.
Figure 7:
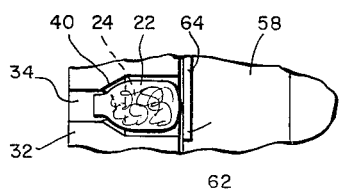
FIG. 7 is a fragmentary view taken on the line VII—VII in FIG. 6, in the direction of the arrows.
Figure 9:
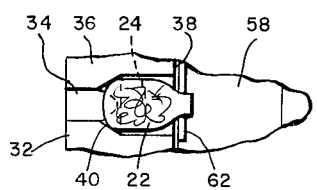
FIG. 9 is a fragmentary view taken on the line IX—IX in FIG. 8, in the direction of the arrows.

As shown in FIGS. 6 and 8, a bulb 22 can be retained in a pocket 40 in one of two positions, either with the neck portion of the bulb facing generally toward the axis of the disc 32, or with the neck portion of the bulb 22 facing away from the axis of the disc 32. If the bulb neck portion faces away from the axis of the disc 32, its position within the pocket 40 will be correct, but if the bulb 22 has its neck portion facing toward the axis of the disc 32, its position will be incorrect and it will be inverted within the pocket 40 in accordance with the present invention.

Turning to FIGS. 4, 5, 6 and 8, as the pockets containing the bulbs are sequentially elevated out of the hopper 68, the excess bulbs are removed from the bulb retaining member 34 by means of the fixed bulb stripping plate 70 which is affixed to the hopper 68. If the bulb is correctly oriented within the pocket 40, as shown in FIG. 6, it will be retained in position in this pocket by means of the cam 62. If the bulb is not correctly oriented within the pocket 40, as shown in FIG. 8, the neck portion of the bulb will project out of the pocket 40 and inwardly toward the axis of the disc 32, because of the predetermined configuration of the pocket 40. The bulb will be kept from completely falling out of the pocket 40, however, by the cam 62.

Figure 10:
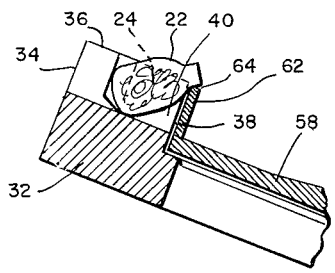
FIG. 10 is a fragmentary view taken on the line X—X in FIG. 4, in the direction of the arrows, showing an improperly oriented bulb as it is being reversed in a pocket of the receiving member.
Figure 11:
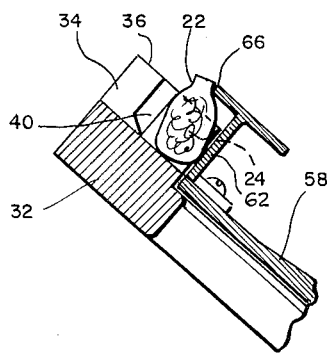
FIG. 11 is a fragmentary view taken on the line XI—XI in FIG. 4, in the direction of the arrows, showing an improperly oriented bulb in a further stage of being reversed in the pocket of the receiving member.

As the disc 32 rotates to elevate the bulb 22 still further, the cam surfaces 64 and 66, which successively contact the lower part of the neck portion of any incorrectly oriented bulb 22, will gradually and progressively force the neck portion of the bulb 22 upwardly, in order to reverse or invert the bulb within the pocket 40. Such a gradual reversal of the bulb 22 by the cam 62 is shown in FIGS. 10, 11 and 12.

After the bulbs pass the cam 62, they are all properly oriented so that the neck portions of all of the bulbs 22 face away from the axis of the disc 32 and all bulbs 22 are retained in the pockets 40 by means of the cam 62.

As shown in FIGS. 1 and 4, an article chute 72 is positioned on the path of rotation of the disc 32, immediately after the termination of the cam 62, and the inlet portion of the article chute 72 is positioned proximate to an elevated portion of the inner surface 38 of the receiving member 34. The cam 62 terminates just before the article chute 72 and this termination of the cam 62 permits the now oriented bulbs 22 to move from the pockets 40 by means of gravity and drop into the inlet of the chute 72.

The chute 72 is fastened to a bracket 74 which in turn is held by a threaded block 76 affixed to the shaft 42. An intermediate portion 78 of the chute 68 is hinged at 80 and guided into position by a bracket 82. A counter-weight 84 is fastened to the hinged, intermediate chute portion 78 and tends to keep the separate chute portions in alignment. Should the lower end of the chute 72 become filled with oriented bulbs 22, the bulbs next enter the hinged, intermediate chute portion 78. When this hinged chute portion 78 is sufficiently filled, the upper tip of the hinged chute portion 78 drops, thereby opening a switch 86 which interrupts the driving motor 48 to stop rotation of the disc 32. When the hinged chute portion 78 is no longer sufficiently filled with bulbs to break contact to switch 82, the motor 48 is again actuated to orient and feed the bulbs.

It will be recognized that the objects of the invention have been achieved by providing an improved bulb feeding and orienting apparatus which is operable to orient randomly disposed, bulb-shaped articles, and to feed the bulb-shaped articles in a desired orientation. There has also been provided an apparatus for inverting an article contained in a moving receptacle or pocket. Details of the foregoing apparatus have also been provided.

While a best embodiment of the invention has been illustrated and described in detail, it is to be particularly understood that the invention is not limited thereto or thereby.

We claim as our invention:

1. Apparatus for properly orienting and feeding randomly disposed, foil-filled photoflash bulbs which are generally symmetrical about a longitudinal axis, and have neck portions which are generally constricted with respect to the body portions thereof, said apparatus comprising:

(a) a generally circular disc having an axis inclined a predetermined amount with respect to the horizontal;

(b) a fixed hopper positioned about the lower portion of the periphery of said inclined disc and adapted to receive the randomly disposed bulbs to be oriented and fed;

(c) means for rotating said disc at a predetermined rate of speed about its axis so that the lower peripheral portion of said disc passes through said hopper;

(d) a generally circular bulb receiving member of predetermined dimensions laterally projecting from the upward-facing peripheral portion of said disc to present a surface which generally parallels said disc and an inner surface which generally faces the axis of said disc;

(e) a plurality of bulb-receiving pockets of predetermined dimensions provided in said bulb receiving member and opening into the surfaces of said receiving member which are parallel with said disc and which face the axis of said disc, each of said pockets when passed through said hopper by rotation of said disc conformed to receive a bulb from said hopper and retain such received bulb with the axial portions thereof generally paralleling said disc, each of said pockets generally conformed to the shape of said bulbs with the smaller portion of each of said pockets which corresponds to the bulb necks facing away from the axis of said disc in order to substantially confine received bulbs whose neck portions face away from the axis of said disc, and the top of the body portion of received bulbs whose neck portions face toward the axis of said disc abutting against the smaller portion of said pockets to cause the neck portions of such bulbs to project a short distance out of said pockets toward the axis of said disc;

(f) elongated fixed cam means positioned on the path of rotation of said disc and proximate to the inner surface of said receiving member to keep retained bulbs from falling out of said pockets, said cam means first acting to successively contact the lower part of any projecting neck portion of said bulbs and progressively elevate such bulb neck portions from the said pockets containing such bulbs, and further rotation of said disc then causing said fixed cam means to completely invert such bulbs within said pockets so that the neck portions of all bulbs which pass said cam means face generally away from the axis of said disc; and (g) article chute means on the path of rotation of said disc immediately after said cam means and having an inlet positioned proximate to an elevated portion of the inner surface of said receiving member, and the termination of said cam means permitting the now-oriented bulbs to move from said pockets to said chute means as bulbs are progressively moved by rotation of said disc proximate to the inlet of said chute means.

2. The apparatus as specified in claim 1, wherein said rotating means rotates said disc at a substantially constant rate of speed.

3. The apparatus as specified in claim 1, wherein the inlet of said chute means is positioned below said pockets when in an elevated position, and retained bulbs move from said pockets and into the inlet of said chute means under the action of gravity.

4. The apparatus as specified in claim 1, wherein shut off means is actuated by the weight of a portion of said chute means when such portion of such chute means is filled with oriented bulbs to shut off said rotating means and stop rotation of said disc.

References Cited by the Examiner
UNITED STATES PATENTS

| | | | |
|---|---|---|---|
| 620,350 | 2/99 | McGrail | 221—171 X |
| 2,060,182 | 11/36 | Dellaree | 221—160 |
| 2,295,599 | 9/42 | Mozel | 221—13 X |
| 2,327,401 | 8/43 | Chilton | 221—167 X |
| 2,332,249 | 10/43 | Nielsen | 221—167 X |
| 2,433,096 | 12/47 | Davis | 221—160 |
| 2,554,788 | 5/51 | Merchant | 221—167 |
| 2,857,039 | 10/58 | Whitecar | 221—156 X |
| 2,949,998 | 8/60 | Whitecar | 221—163 X |
| 2,985,338 | 5/61 | Everett | 221—9 |

FOREIGN PATENTS 583,753   12/46   Great Britain.

RAPHAEL M. LUPO, *Primary Examiner.*

KENNETH L. LEIMER, *Examiner.*